United States Patent [19]
Takahashi

[11] Patent Number: 5,754,797
[45] Date of Patent: May 19, 1998

[54] APPARATUS FOR ALLOWING SMOOTH HOT INSERTION AND REMOVAL OF A PERIPHERAL BY GRADUALLY APPLYING AND REMOVING POWER TO THE PERIPHERAL

[75] Inventor: Akira Takahashi, Tokyo, Japan

[73] Assignee: Mitsubishi Denki Kabushiki Kaisha, Tokyo, Japan

[21] Appl. No.: 598,105

[22] Filed: Feb. 7, 1996

[30] Foreign Application Priority Data

Feb. 13, 1995  [JP]  Japan ................... 7-024073

[51] Int. Cl.⁶ .......................................... H01J 13/00
[52] U.S. Cl. .......................................... 395/283; 361/58
[58] Field of Search .......................... 395/281–283; 361/58

[56] References Cited

U.S. PATENT DOCUMENTS

| | | | |
|---|---|---|---|
| 5,272,584 | 12/1993 | Austruy et al. | 361/58 |
| 5,317,697 | 5/1994 | Husak et al. | |
| 5,369,593 | 11/1994 | Papamarcos et al. | 364/488 |
| 5,376,831 | 12/1994 | Chen | 327/379 |
| 5,383,081 | 1/1995 | Nishikawa et al. | 361/58 |
| 5,384,492 | 1/1995 | Carlson et al. | 307/147 |
| 5,530,302 | 6/1996 | Hamre et al. | 307/147 |
| 5,530,810 | 6/1996 | Bowman | 395/283 |
| 5,548,712 | 8/1996 | Larson et al. | 395/182.05 |
| 5,572,395 | 11/1996 | Rasums et al. | 361/58 |
| 5,584,030 | 12/1996 | Husak et al. | 395/750 |
| 5,589,719 | 12/1996 | Fiset | 307/131 |
| 5,604,873 | 2/1997 | Fite | 395/283 |

FOREIGN PATENT DOCUMENTS

| | | |
|---|---|---|
| 4-101622 | 4/1992 | Japan . |
| 6-161606 | 6/1994 | Japan . |
| 6161606 | 6/1994 | Japan . |

OTHER PUBLICATIONS

IBM Technical Disclosure Bulletin, "Soft–Stop Circuit Permits Hot–Unplugging of Boards", Aug. 1994.

IBM Technical Disclosure Bulletin, "Circuit Allowing Installation and Removal of a Device Under Power" Sep. 1994.

Research Disclosure "Circuit Card with Contacts of Five Different Lengths for Gradual Current Change when Card is Plugged in or Unplugged", Jul. 1992 Emsworth, GB.

*Primary Examiner*—Jack B. Harvey
*Assistant Examiner*—Sumati Lefkowitz
*Attorney, Agent, or Firm*—Wolf, Greenfield & Sacks, P.C.

[57] ABSTRACT

An interface between a main computer 20 and a peripheral unit 30 allows connection/disconnection of the peripheral unit to and from the main computer during the operation of the main computer, while achieving reduction of fluctuation in the source voltage caused by hot line connection/disconnection, as well as a reduction of the circuit size. The interface includes a connector having long terminal pairs and short terminal pairs, by which the peripheral unit 30 is connected to the main computer 20. The peripheral unit 30 contains a delay circuit comprised of a FET 10 for controlling ON/OFF operation of the electric current path, a capacitor C1, and resistors R1 and R2. The signal path containing R1 and R2 forms a closed loop only when the peripheral unit is completely inserted into the main computer. During the insertion, the long terminal pairs are first connected, which is followed by connection of the short terminal pair. After the connection of the short terminal pair, C1 is charged and the FET 10 is gradually switched ON. During the extraction of the peripheral unit, C1 starts being discharged after disconnection of the short terminal pair and the FET 10 is gradually turned OFF. As a result, electric current supply is varied smoothly.

12 Claims, 8 Drawing Sheets

APPARATUS FOR ALLOWING SMOOTH HOT INSERTION AND REMOVAL OF A PERIPHERAL BY GRADUALLY APPLYING AND REMOVING POWER TO THE PERIPHERAL

BACKGROUND OF THE INVENTION

1. Field of the Invention

This invention relates to an interface between a peripheral unit, which is powered by electric current fed from a main unit, and the main unit, and more particularly to an interface circuit which allows connection/ disconnection of the peripheral unit to/from the main unit during the electrical operation of the main unit (i.e. when the main unit is switched on).

2. Description of the Prior Art

Currently, many combinations exist of a main electronic unit and a peripheral unit which is removably attached to the main unit. One example of such a combination is a computer and an optional card. In this example, the computer is a main unit and the optional card is a peripheral unit.

Peripheral units include not only those that are easily inserted/removed by a user, such as a PCMCIA card, but also a redundant circuit card for a highly reliable computer system, which is attached/detached only by a maintenance operator. In the former case, insertion or removal of the peripheral unit tends to occur while the main unit is powered on (hereinafter, referred to as "hot line connection/ disconnection" or "hot line insertion/extraction"), due to the fact that ordinary users lack sufficient knowledge about the electronic apparatus. Nevertheless, such an action is naturally not recommendable. On the other hand, the latter often necessitates hot line connection/disconnection in order to avoid taking the system down. Either case requires some countermeasures for avoiding malfunction in the main unit or electrical damage to the main and peripheral unit.

JPA H6-161606 discloses an interface effective for such hot line insertion/extraction of the peripheral unit to/from the main unit (hereinafter referred to as a prior art system), which is illustrated in FIG. 8.

In this figure, numeral 2 designates a backboard of a main unit, and numeral 3 designates a substrate which corresponds to a peripheral unit. The backboard 2 (i.e. the main unit) is operated by a power supply voltage V.

The substrate 3 contains a field-effect transistor (FET) 10 for controlling opening and closing of an electric current feeding path, a buffer resister R3 which ensures steady electric current flow during the OFF state of the FET 10 to prevent a abrupt change in electric current caused by ON/OFF operation of the FET 10, and a delay circuit consisting of resisters R1, R2, and a capacitor C1. The delay circuit is employed for delaying the start of the electrical feed when the substrate 3 is inserted into the backboard 2. After a predetermined delay from the insertion of the substrate 3, which is defined by a time constant of the delay circuit, the base voltage of the FET 10 falls to a potential determined by the dividing resisters R1 and R2 and constant electric current feeding is carried out.

The substrate 3 also contains a delay inhibiting circuit 18 for prohibiting delay generated by the delay circuit, which comprises a photocoupler (PC1) and a resister R4. When electric current flows into the LED 17 of the photocoupler PC1, the transistor of the photocoupler is turned ON, making the voltage across the capacitor 1 zero, which prohibits the delay generation. During this operation, the resister R4 controls the electric current flowing into the LED 17.

During the normal operation, the substrate 3 receives an electrical supply through the FET 10, where the input voltage of the FET 10 is Vi. The symbol Vi is only for convenience, and is in fact substantially equal to the source voltage V. On the other hand, the output voltage of the FET 10 is connected to a predetermined load circuit (not shown), and thus, the substrate 3 functions as a peripheral unit.

The substrate 3 further includes a connecter for connection with the backboard 2. The connecter has a long terminal set, the pin contact of which is relatively long, and a short terminal. The long terminal set includes source terminals and ground terminals and are connected to the corresponding terminal set of the backboard 2. One end of the short terminal is grounded to a signal ground (SG) terminal of the backboard 2, and the other end is connected to the delay inhibiting circuit 18 of the substrate 3. In this structure, even when only a long terminal set is connected to the backboard 2, the source of the FET 10 (with a voltage Vi) is grounded via the resistors R1, R2 and R4, and is connected to the load circuit via the resistor R3, thereby securing electrical current flow in spite of disconnecting state of the short terminal.

The action of electrical current supply in such a prior art structure will be described in more detail.

(i) Insertion (Attaching) of the Substrate

When inserting the substrate 3, the long terminal set is first connected with the corresponding terminal set of the backboard 2 and the ground terminals are connected to the SG terminals of the backboard 2, whereby the voltage Vi becomes equal to the source voltage V. Electric current is supplied to the resistors R1 and R2. However, the FET 10 is not turned ON yet at this stage, because the electric current flows via the resistor R4 into the LED 17 of the photocoupler PC1 in the delay inhibiting circuit 18, which puts the transistor of the PC1 in the ON state, resulting in that the voltage across the capacitor C1 becomes equal and the source gate voltage Vgs of the FET 10 becomes 0.

The short terminal is connected with the corresponding SG of the backboard 2, and the input to the LED 17 of the PC1 is connected to SG. No electric current flows into the LED 17 and the transistor of the PC1 is turned off. Both ends of the capacitor C1 become open, and the charge by Vi to the capacitor is started. The time constant of the delay circuit at this time is represented as the following equation.

$$C = R1 * R2 * C1 / (R1 + R2) \quad (1)$$

During this operation, the source gate voltage Vgs of the FET is gradually increased, and when a delay time defined by the order of the time constant has passed, the FET 10 is turned ON. Namely, after a predetermined time from the connection of the short terminal, regular electric supply is started. Generally, electric current flowing through the FET 10 increases as Vgs increases, and therefore, the output voltage of the FET 10 increases with a gentle slope as the time constant becomes larger.

In this manner, electric feeding can be gradually increased with the hot line insertion of the substrate 3. However, in reality, the increase of the electric feeding can not be uniformly achieved due to the presence of the resistor R3, since the resistor R3 starts feeding electric current to the substrate 3 upon connection of only the long terminal set. The presence of the resistor R3 is rather more important for extraction (detaching) of the substrate 3 than for insertion thereof, as will be described below.

(ii) Extraction of the Substrate

When the extraction of the substrate 3 is started, the short terminal is first detached from the backboard 2. Namely, the LED 17 of the PC1 is disconnected from SG of the backboard 2, the transistor of the PC1 is turned on, and both ends of the capacitor C1 are short-circuited. The voltage across the capacitor C1 become zero, and Vgs of the FET 10 drops instantly and the transistor is immediately turned off. Thus, among the electric supply paths extending to the substrate 3, the current path from the FET 10 is instantaneously shut off, and only the electric current supply via the resistor R3 remains, which is also finally shut off by the disconnection of the long terminal set.

During the extraction of the substrate 3, the electric current supply is lowered in the final state through two stages, similar to the insertion operation, but the fluctuation in the electric feeding caused by the ON-OFF operation of the FET 10 is larger than that in the insertion operation. This means that, in such a prior art structure, the resistor R3 functions so as to moderate the abrupt shutoff of electric supply caused when the FET 10 is turned off.

The above mentioned prior art method, which enables the hot line attaching/detaching of the substrate, was conceived in order to overcome the malfunction of the backboard 2 or other substrates which have already been attached to the backboard 2 caused during the insertion of the substrate. More particularly, when the FET 10 is turned on, a large amount of transient current flows into the substrate 3, which causes a fluctuation of the source voltage V, resulting in the malfunction of the backboard or other substrates. Therefore, the prior art method focusses on the electric feeding action during the insertion of the substrate. The phenomena of the transient current is considered from the following two viewpoints.

(i) Transient Current Peak

When the peak transient current exceeds the feed capacity of the power source of the backboard 2, the source voltage V drops. The prior art method described above mainly aims at solving this problem. The transient current is caused by rush current to a bypass capacitor on the substrate 3, excessive current dissipated at the activation of a circuit element (e.g. integrated CMOS apparatus) mounted on the substrate 3. Problems arise when the transient current exceeds a normal operation current constantly consumed during the normal operation of the substrate 3, because the source of the backboard 2 has a capacity of feeding at least the normal operation current. Accordingly, this problem is to be overcome by ON/OFF control of the FET 10.

(ii) Derivative (Rate of Change) of Transient Current

As well as the peak value, the differential value of the transient current must be considered. Even when the peak transient current is within the permissible range, a local and momentary drop of the source voltage is caused by the inductance component of the power supply system of the backboard 2 when an abrupt change occurs in electric current. In the prior art system, since the FET 10 is instantaneously turned off during the extraction of the substrate 3, the rate of change in the transient current is large in spite of the presence of the buffer resister R3. Also during the insertion of the substrate, the rate of change of the transient current is discontinuous when the FET 10 is turned on, in the case that the circuit constant of, for example, the delay circuit is not carefully selected.

Thus, when discussing the voltage fluctuation in the backboard 2, not only a peak transient current, but also a rate of change must be considered. The reason why the prior art method does not consider the detaching operation is that the main purpose is to solve the problem of the peak transient current beyond the permissible range during insertion.

SUMMARY OF THE INVENTION

In order to overcome the above-mentioned problems (i) and (ii), it is an object of the invention to achieve a smooth increase and decrease of electric current flow both at the time of starting and the time of stopping the electric current feeding from the main electronic unit to the peripheral unit. This should be realized in the form of an interface system between the main and peripheral units, since it is not always possible to provide such a circuit in only one of the main or peripheral units.

It is another object of the invention to obviate the buffer resistance R3 to reduce the size of the peripheral unit. Generally, the resistance of the resistor R3 must be small in order to give a constant buffer effect, and therefore, the resistor R3 must dissipate a large amount of electric power. This means that the size of a resistor must be large, which is disadvantageous for miniaturization of the peripheral unit due to its large mounting area and unnecessary heat generation. Also, it is necessary to set the resistance value of R3 to a most appropriate one for each peripheral unit in connection with the electric current flowing in response to the ON/OFF operation of the FET 10.

In order to achieve the objects, an interface system between a peripheral unit and a main unit, in accordance with the invention, comprises monitor means for monitoring whether or not the peripheral unit is in a predetermined state where it is completely inserted into (or connected with) the main unit, and control means for controlling electric current supply from the main unit to the peripheral unit. In this structure, the monitor means checks whether or not the connection between the peripheral unit and the main unit is in a predetermined complete state. In parallel to this operation, electric current control means controls the electric current supplied from the main unit to the peripheral unit on the basis of the monitoring result obtained by the monitor means.

More particularly, during the insertion of the peripheral unit into the main unit, the control means prohibits electric current feeding to the peripheral unit until it has reached the completely inserted state, while, after reaching the completely inserted state, it starts and gradually increases electric current feeding to the peripheral unit for a predetermined time period and then maintains a steady electric current supply.

During the extraction of the peripheral unit from the main unit, steady electric current supply is maintained before the peripheral unit is taken out of the completely inserted state, while electric current feeding is gradually decreased when the peripheral unit is taken out of the completely inserted state, and is finally stopped after a predetermined time period. As a result, not only the peak value of the transient electric current flowing from the main unit to the peripheral unit, but also the derivative (rate of change) can be maintained within a predetermined range, reducing the possibility of malfunctions in the main or peripheral units caused by fluctuation of the source voltage. Furthermore, as a secondary effect, the buffer resistance required for the conventional method can be obviated, conferring a design advantage.

The interface system further comprises a connector for connecting the peripheral unit to the main unit. The connector includes long terminal pairs consisting of female pins and long male pins, and at least one short terminal pair consisting of at least one female pin and a short male pin. The state where the short terminal pair is connected is defined as a completely inserted state. By monitoring the connecting state of the short terminal pair between the main unit and peripheral unit, the monitor means can determine whether they are in a completely inserted state. This type of connector is common, and is easily applicable to the present invention.

The long terminal pairs include at least source terminal pairs for supplying electric current from the main unit to the peripheral unit, and ground terminal pairs. Prior to the complete insertion, the signal ground terminals are first connected while receiving a source voltage from the main unit via the source terminals, preparing for the complete insertion.

The interface system may also comprise a movable element for securing the fixed connection between the main and peripheral units. The movable element moves between the first position, where the connection is secured, and the second position where the securing is released. In this case, the completely inserted state is defined as a state where the movable element is in the first position. The monitor means monitors the position of the movable element to determine whether or not the main and peripheral units are in the completely inserted state. The movable element, such as an attachable/detachable lever, may be a common one so as to be easily applicable to the present invention.

The interface system of the invention may also have a switch interlock with the movable element, which is pushed down when the movable element is at the first position, and is releasable when required. The monitor means monitors the state of the switch to determined whether or not the peripheral unit is completely inserted into the main unit. Because of the cooperation of the movable element with the interlock switch, the position of the movable element can be electrically detected.

The monitor means includes a signal line indicating the state of electric current flow. The value of electric current flow is varied depending on the connecting state of the peripheral unit to the main unit. The electric current control means includes a delay circuit receiving an input voltage, the value of which is varied depending on the electric current flowing through the state indicating signal line. By converting the differential of the electric current into a voltage and by delaying it, transient time of the electric current supply can be easily determined.

The delay circuit may be a integrating circuit including a resistor and a capacitor, and the predetermined time period for the gradual increase and decrease of electric current feeding is determined based on the time constant of the delay circuit. The transient time is also accurately determined based on the time constant.

During the extraction of the peripheral unit from the main unit, the time constant is set to equal to or smaller than the predetermined time period taken from start to completion of extraction. Thus, the electric current feeding from the main unit will have been stopped by the time of complete extraction, thereby preventing instantaneous cutoff of electric current, and reducing the possibility of fluctuation in the source voltage of the main unit.

As a further modification, the monitor means includes a state indicating signal line, through which the electric current flows at a value varied depending on the connecting state of the peripheral unit to the main unit, and the electric control circuit includes a signal integrator and a switching element for ON/OFF control of the electric current path from the main unit to the peripheral unit. The output of the signal integrator is connected to the ON/OFF control terminal of the switching element regardless of whether the connection between the main and peripheral units is in the completely inserted state or not.

In this structure, the input voltage to the signal integrator is varied depending on whether the completely inserted state is achieved or not, which naturally means that the output of this circuit is also varied depending on the connection state of the main and peripheral units. Accordingly, it is possible to separately carry out the ON/OFF control of the switching element between the completely inserted state and the other state. The signals integrated by the integrator show gentle changes, which allows the ON/OFF operation of the switching element to be performed gradually, with a minimum fluctuation in the source voltage of the main unit.

The electric current control means may further include a second signal integrator, to which a voltage is applied at a value varied in accordance with the electric current value through the state indicating signal line. The output of the second integrator is connected to the ON/OFF control terminal of the switching element only when the connection state between the main and peripheral units is the completely inserted state. When the completely inserted state is achieved, both the first and second signal integrators take part in the ON/OFF control of the switching element. On the other hand, when detaching the peripheral unit (i.e. moving out of the completely inserted state), only the first signal integrator effects the ON/OFF control of the switching element. Thus, it is possible to separately carry out the ON/OFF control of the switching element between the inserting operation and the removing operation. As a result, the time constant for the insertion can be set to be large because the transient electric current is an important problem, while the time constant for the extraction can be set to be small because it is desired to stop the electric current feeding within a predetermined time.

The output of the second signal integrator is connected to the ON/OFF control terminal through the signal line which forms a closed loop between the main and peripheral units only when the peripheral unit is in the completely inserted state. In this structure, only during the completely inserted state, electric current flows in the closed loop to generate a necessary voltage for controlling the ON/OFF state of the switching element.

The output of the second signal integrator may be connected to the ON/OFF control terminal via a second switching element which is turned ON only when the peripheral unit is in the completely inserted state. During the completely inserted state, both the first and second signal integrators take part in the ON/OFF control of the switching element, while when not in the completely inserted state, only the first signal integrator effects the ON/OFF control of the switching element. As has been described, it is possible to separately carry out the ON/OFF control of the switching element between the inserting operation and the removing operation, and the time constant for the insertion can be set to be large for overcoming the problem of the transient electric current, while the time constant for the extraction can be set to be small for the stopping of the electric current feeding within a predetermined time. The second switching element can obviate a mutual effect between the circuits for determining the time constants for insertion and extraction of the peripheral unit.

The switching element may be FET, and the output of the signal integrator is connected to the gate of the FET. The electric current feeding is controlled by the ON/OFF operation of the FET. Since the signals integrated by the signal integrator have gentle changes, the ON/OFF operation is gradually performed, thereby maintaining the voltage drop in front of and beyond the transistor within a constant region during the electric current feeding. Also, with a gradual change of Vgs, fluctuation in the source voltage of the main unit can be prevented.

The state indicating signal line forms a closed loop only when the completely inserted state is achieved, and direct-current flows in the loop only at this time, which can generate a necessary voltage to control the ON/OFF operation of the switching element.

Other objects and features of the invention will become apparent to those skilled in the art from the detailed description with reference to the attached drawings.

DETAILED DESCRIPTION OF THE PREFERRED EMBODIMENT

<Embodiment 1>

Figure 1:
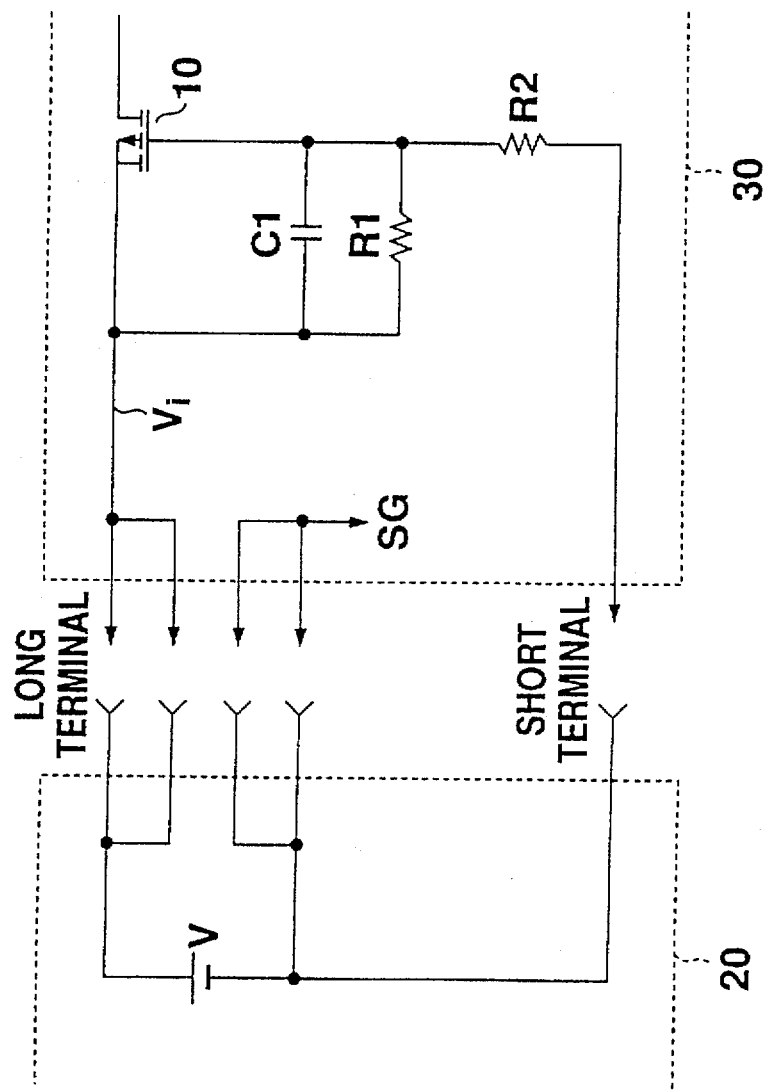
FIG. 1 is a schematic circuit diagram of the interface apparatus in accordance with the first embodiment of the invention.
Figure 8:
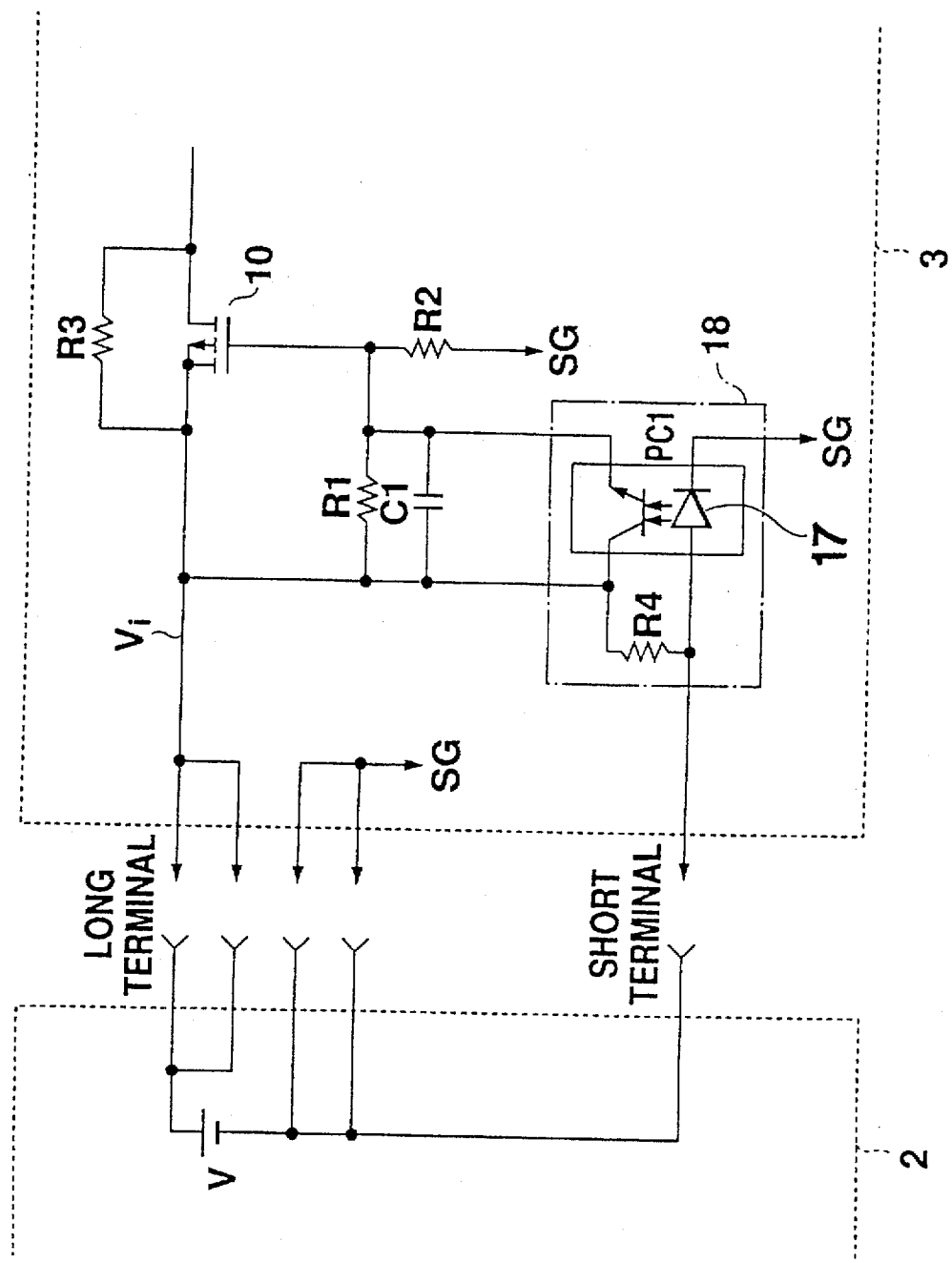
FIG. 8 is a schematic circuit diagram of the active attachable/detachable interface apparatus in prior art.

The structure of the interface apparatus in accordance with the first embodiment is shown in FIG. 1, where the same numerals are assigned to the same elements as those shown in FIG. 8.

Since the present invention is directed to an interface system which allows hot-line insertion and extraction of a peripheral unit to and from a main unit, the backboard 2 and the substrate 3 are generalized to a main unit 20 and a peripheral unit 30, respectively.

It is characteristic that the buffer resistor R3 and the delay inhibiting circuit 18 shown in FIG. 8 are omitted. Furthermore, the delay circuit R2, which functions as an RC integrator, is connected to the short terminal, not to the signal ground as shown in the conventional circuit. As a result, even when the long terminals (i.e. source terminals) are connected, the path from the source of the FET 10 (having a voltage Vi) leading via the delay circuit to the signal ground is open as long as the short terminal pair is not connected.

Since in the embodiment the connecting state of the short terminal pair is important, the state where the short terminals pair is connected is defined as a completely inserted state of the peripheral unit 30 into the main unit 20. Whether the completely inserted state is achieved or not is determined by monitoring electric current flowing in a signal line extending from the source terminal via the R1 and R2 to the short terminal (hereinafter referred to as a state indicating signal line). More particularly, only during the completely inserted state, the state indicating signal line forms a closed loop between the main unit 20 and the peripheral unit 30, into which a direct-current flows.

The voltage applied to the each element of the delay circuit varies in accordance with the value of the electric current flowing in the signal line. Delay in the delay circuit defines a time period for gradual increasing or decreasing of electric current feeding, and after the time period, steady electric current feeding is started, or the feeding is stopped. A delayed signal is presented between R1 and R2 (i.e. output from the delay circuit) and is input to the gate of the FET 10. In other words, the given time period of delay is the time period required for smooth ON/OFF operation of the FET 10 for avoiding an abrupt change in electric current feeding.

Electric current flow during the hot attaching/ detaching in accordance with the embodiment will now be described.

[1] Insertion (Attaching) of the Peripheral unit

The long terminal pairs are first connected, the SG of the peripheral unit 30 is connected to the main unit 20, and Vi becomes equal to the source voltage V. At this time, the state indicating signal line is still open, and no electric current flows. The voltage across the capacitor C1 becomes zero, and the FET 10 is in the OFF state. This structure allows the delay inhibiting circuit 18, which is necessary for the conventional technique, to be obviated.

The short terminal pair is connected to achieve the completely inserted state, and C1 is charged by Vi. The time constant of the delay circuit at this time is expressed by the equation (1), similarly to the conventional method. The source gate voltage Vgs of the FET 10 becomes higher, and the value of electric current flowing in the transistor gradually increases. Generally, in the FET, the rate of increase of the electric current flow is in proportion to the source gate voltage (i.e. the smaller the Vgs, the smaller the increasing rate). Therefore, the derivative (i.e. rate of change) of the electric current flow is substantially 0 at the start of the electric current feeding. As a result, smooth increasing of electric current feeding is achieved.

The values of the resistors R1 and R2 are set so as to satisfy the following equation in order to assure that the FET 10 can supply necessary and sufficient electric current for the normal operation.

$$R1*Vi/(R1+R2) \geq Vgs0 \qquad (2)$$

where Vgs0 is a gate source voltage which can allow the FET 10 to supply sufficient normal operation electric current, but is not necessarily so high that the FET 10 is completely turned ON, as is understood from the object of the invention. It is preferable to set Vgs to be slightly low in order to restrict the peak value of the transient current.

[2] Extraction of the Peripheral unit

The short terminal pair is first disconnected, and the main and peripheral units get out of the completely inserted state. The state indicating signal line becomes open, and the electric charge stored in C1 is discharged through R1. The time constant of the circuit consisting of C1 and R1 is represented as C1*R1. During the discharge, Vgs is gradually decreased, and the electric current flowing in the FET 10 is also decreased. The value of Vgs finally reaches 0. Thus, smooth decrease of electric current feeding is achieved over the range from the normal operation current to zero, and as a result, the buffer resistance R3 can be obviated.

It should be understood that it is not preferable for the extraction of the peripheral unit to be completed before the value of electric current supply reaches zero, because the completion of the extraction (i.e. disconnection of the long terminal pairs) causes an instantaneous drop of the electric current supply to zero, which may further cause fluctuations in the source voltage of the main unit.

For this reason, in the embodiment, the time constant C1*R1 is set to be smaller than the necessary time period taken for the complete extraction. Though the necessary time period varies depending on, for example, the fitting length of the terminals, it is normally from several milliseconds to several tens of milliseconds. Accordingly, by setting the time constant C1*R1 to, for example, 10 milliseconds, preferable hot-line detaching can be achieved.

As has been described, smooth increasing and decreasing of electric current can be achieved by means of a FET 10, and the peak value and the rate of change of the transient current can be restricted within a constant range. This effect further leads to obviation of the buffer resistor which is required in the conventional circuit.

Although the FET is used for opening and closing of the electric current path, other elements such as an ordinary bipolar transistor may be used. However, in the case that voltage drop by the transistor may be a problem. Also, in the embodiment, the RC integrator is used as a delay circuit, but it may include any other circuit element, such as an inductance element, as long as the circuit has a delay function and an integral function.

<Embodiment 2>

Figure 2:
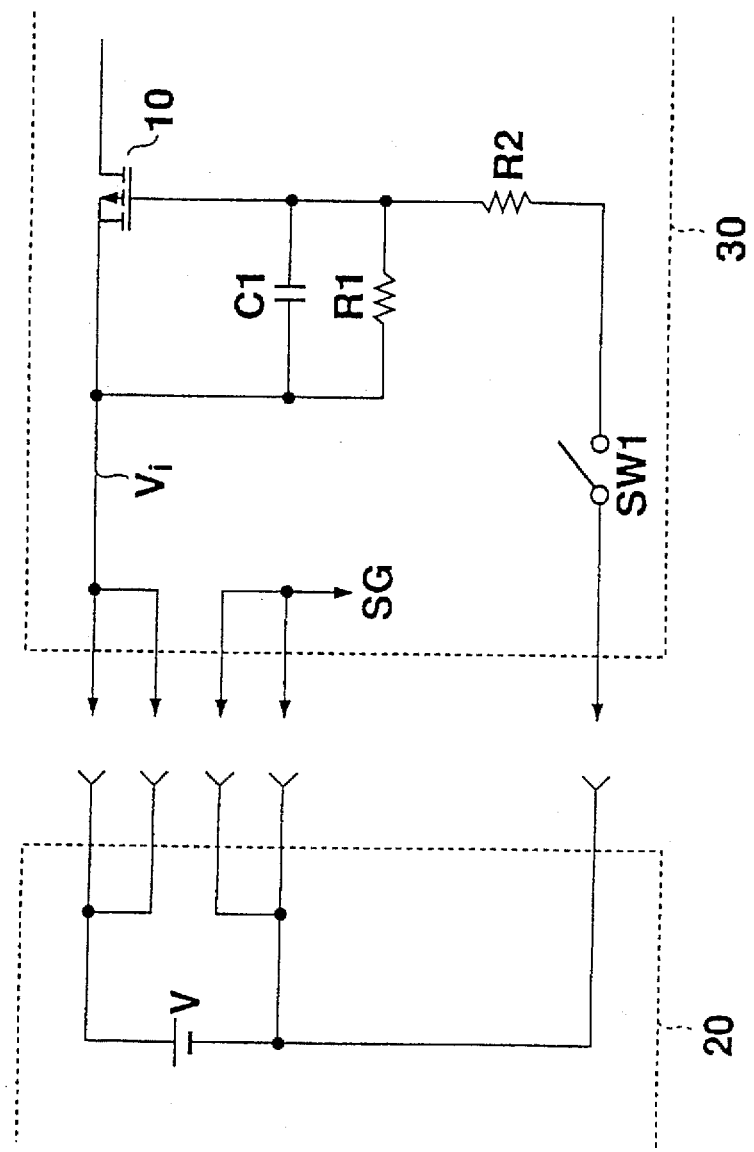
FIG. 2 is a schematic circuit diagram of the interface apparatus in accordance with the second embodiment of the invention.

FIG. 2 shows an interface apparatus circuit in accordance with the second embodiment. The same numerals are assigned to the same elements as those in the first embodiment.

The feature of the interface apparatus of the second embodiment is a movable element (not shown) for reinforcing fixing of the peripheral unit to the main unit. This embodiment can achieve the same effect as the first embodiment. The movable element is a lever which moves between a first position for securing the connection between the main unit and peripheral units and a second position for releasing the securing. The lever is manually operated to select the necessary position.

In this embodiment, the completely inserted state is defined as a state where the lever is in the first position. In reality, there may occur a case that the lever is moved to the first position even when the peripheral units is not inserted. However, this does not cause a problem because the lever is inevitably returned to the second position before the insertion, otherwise insertion will not be allowed.

This embodiment requires a switch SW1 interlock with the lever, as is shown in FIG. 2. The state of the interlock switch is changed in response to the position of the lever. For instance, the switch is adapted to be pushed only when the lever is in the first position. In this structure, it is determined that the peripheral unit is in the completely inserted state only when the switch is pushed down. By monitoring the state of the switch, electric current flow is preferably controlled. In this embodiment, the path from the source terminal through R1 and R2 to the switch SW1 is a state indicating signal line. Monitoring the state of the switch corresponds to monitoring of the connecting state of the short terminal pair in the first embodiment. Therefore, in this embodiment, the contact lengths of the terminal pairs of the connector may all be the same.

The hot-line attaching and detaching will now be described, emphasizing differences from the first embodiment.

[1] Insertion (Attaching) of the Peripheral unit

As a premise for insertion, the lever must be in the second position, and the switch SW1 in the OFF state. In the insertion, all the terminals are connected at the same time, but the state indicating signal line is still opened.

The lever is moved to the first position to secure the connection of the main and peripheral units. The SW1 is turned on and charging of the C1 is started. Later operation of electric current feeding is the same as the first embodiment.

[2] Extraction (Detaching) of the Peripheral unit

Prior to removing the peripheral unit, the lever is returned to the second position from the first position. The main and peripheral units are taken out of the completely inserted state despite that the terminal pairs are still connected, and the state indicating signal line becomes opened. The C1 starts to be discharged and electric current feeding is stopped within a predetermined time period, similar to the first embodiment.

When setting the time constant C1*R1 to be smaller than the required time period taken from starting to finishing extraction, the value of C1*R1 can be set larger than that in the first embodiment, because the time period for the complete extraction includes extra time for lever operation, normally about 1 second. Therefore, the value of the C1*R1 can be set to, for example, 100 milliseconds. The larger the value of C1*R1, the smaller the rate of change of electric current feeding, which is preferable for circuit design.

Although in this embodiment a lever is used as a movable element, alternatives such as a push-in button or screw can be used. Although the lever is used only for securing and releasing the connection, another type of lever, for example, a type where the lever operation causes the peripheral unit automatically to be pushed out, can be employed. Similarly, various types of interlock switch (e.g. push type, slide type, optical type, etc.) can be used. In this embodiment, it is assumed that the switch is turned on when it is pushed down, but of course the reverse is also permissible. In the reverse case, the push-down of the switch is released only when the lever is in the first position.

<Embodiment 3>

Figure 3:
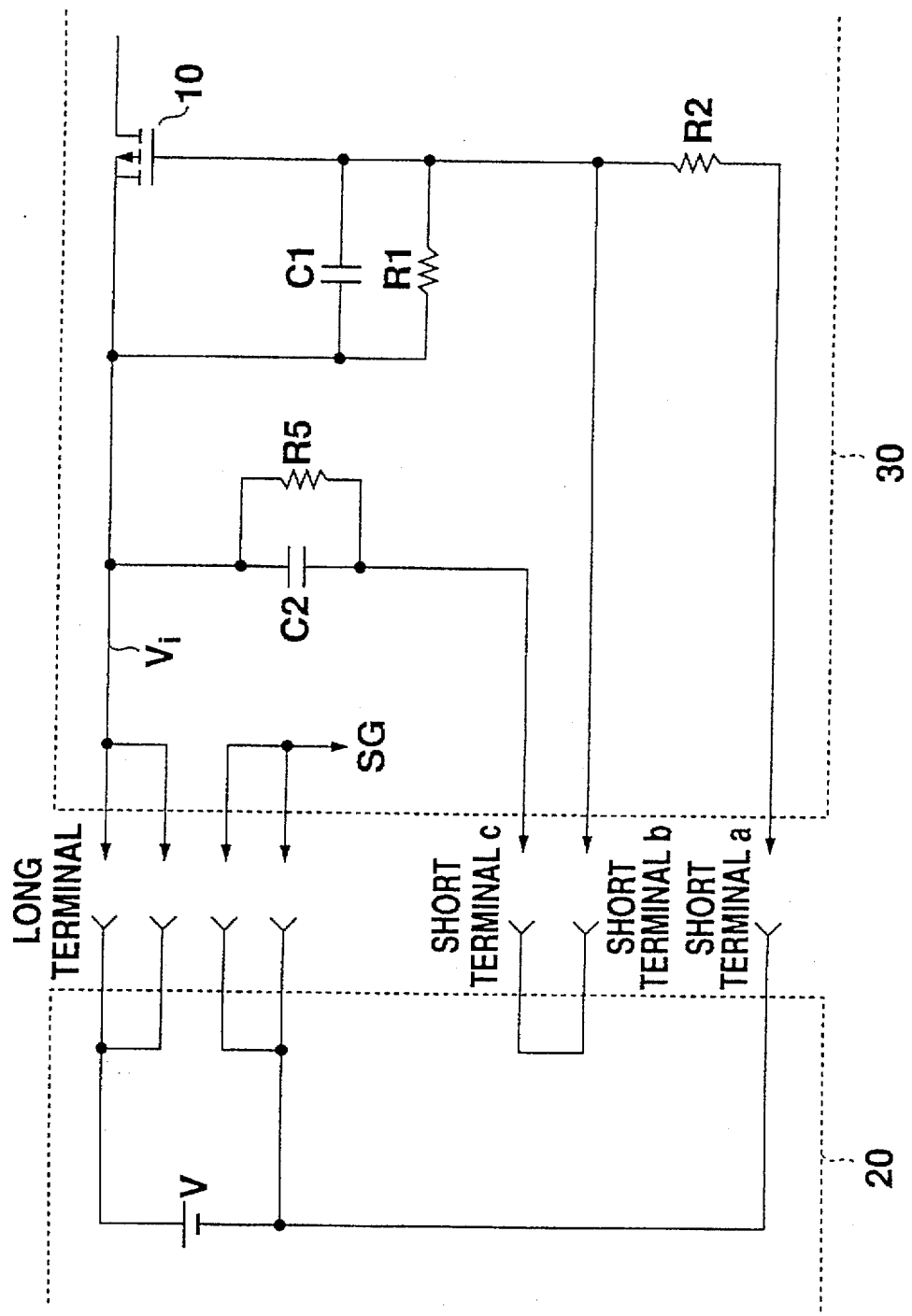
FIG. 3 is a schematic circuit diagram of the interface apparatus in accordance with the third embodiment of the invention.

The feature of this embodiment is that a second delay circuit is included, as is seen from FIG. 3. During the insertion, both delay circuits generate delays, while during the extraction, only the first delay circuit generates a delay. This structure is especially effective when a larger delay is required for the insertion operation, while the delay for the extraction operation must be restrained within a desired range.

The connector includes both long and short terminal pairs, similarly to the first embodiment. However, in this embodiment, at least three short terminal pairs "a", "b", and "c" are required. The short terminal pair "a" is used for the same purpose of the first embodiment. The short terminal pairs "b" and "c" are interconnected at the main unit side, and are used as a signal line forming a closed loop between the main and peripheral units during the completely inserted state. This signal line is referred to as a second state indicating signal line.

The second delay circuit comprises a capacitor C2, a resistor R5, and the resistor R2 shared by the first delay circuit. The capacitor C2 and resistor R5 are arranged in parallel, and are connected between the source terminals (long terminals) and the short terminal "c". The resistor R2 is connected to the short terminal "b".

In this structure, the first signal line extends from the source terminals via the R1 and R2 to the short terminal "a" (SG), and the second signal line extends in the order of the source terminals→R5→short terminal "c"→short terminal "b"→R2→short terminal "a" (SG). Both state indicating signal lines form closed loops only when the short terminal pairs are connected. In the completely inserted state, a delay signal delayed by the second delay circuit is present between R5 and R2, and is referred to as an output signal of the second delay circuit. Differing from the output from the first delay circuit, the output of the second delay circuit is connected to the gate of the FET 10 only in the completely inserted state.

Electric current feeding for the hot-line attaching/detaching is as follows.

[1] Insertion of the Peripheral unit

The long terminal pairs are first connected, but no electric feeding is started yet. At least three short terminal pairs are connected, the first and second signal lines form closed loops, respectively, and the capacitors C1 and C2 are charged. The time constant, taking into account the effect of both delay circuits, is expressed as follows.

$$C = R1*R2*R5*(C1+C2)/(R1*R2+R2*R5+R5*R1) \quad (3)$$

The resistance value is set within the range represented as below.

$$Vi*(R1+R2+R2*R5)/(R1*R2+R2*R5+R5*R1) \geq V_{gs}0 \quad (4)$$

where the definition of Vgs0 is the same as the first embodiment.

[2] Extraction of the Peripheral unit

When the short terminal pairs are first disconnected, the capacitor C2 and resistor R5 are completely removed from the system of the peripheral unit, and do not take part in the later electric current feeding. Thus, the later behavior of the electric feeding is the same as the first embodiment. The time period taken for complete extraction is provided by the time constant C1*R1.

In order to set the time constant for insertion to be large, the value of C2 is set large, in reference to the above equation (3). Since C2 does not effect the time constant for the extraction of the peripheral unit, the value of C1*R1 can be set small, for example, in the order of 10 milliseconds, thereby realizing relatively quick stopping of electric current feeding before the complete extraction.

Figure 4:
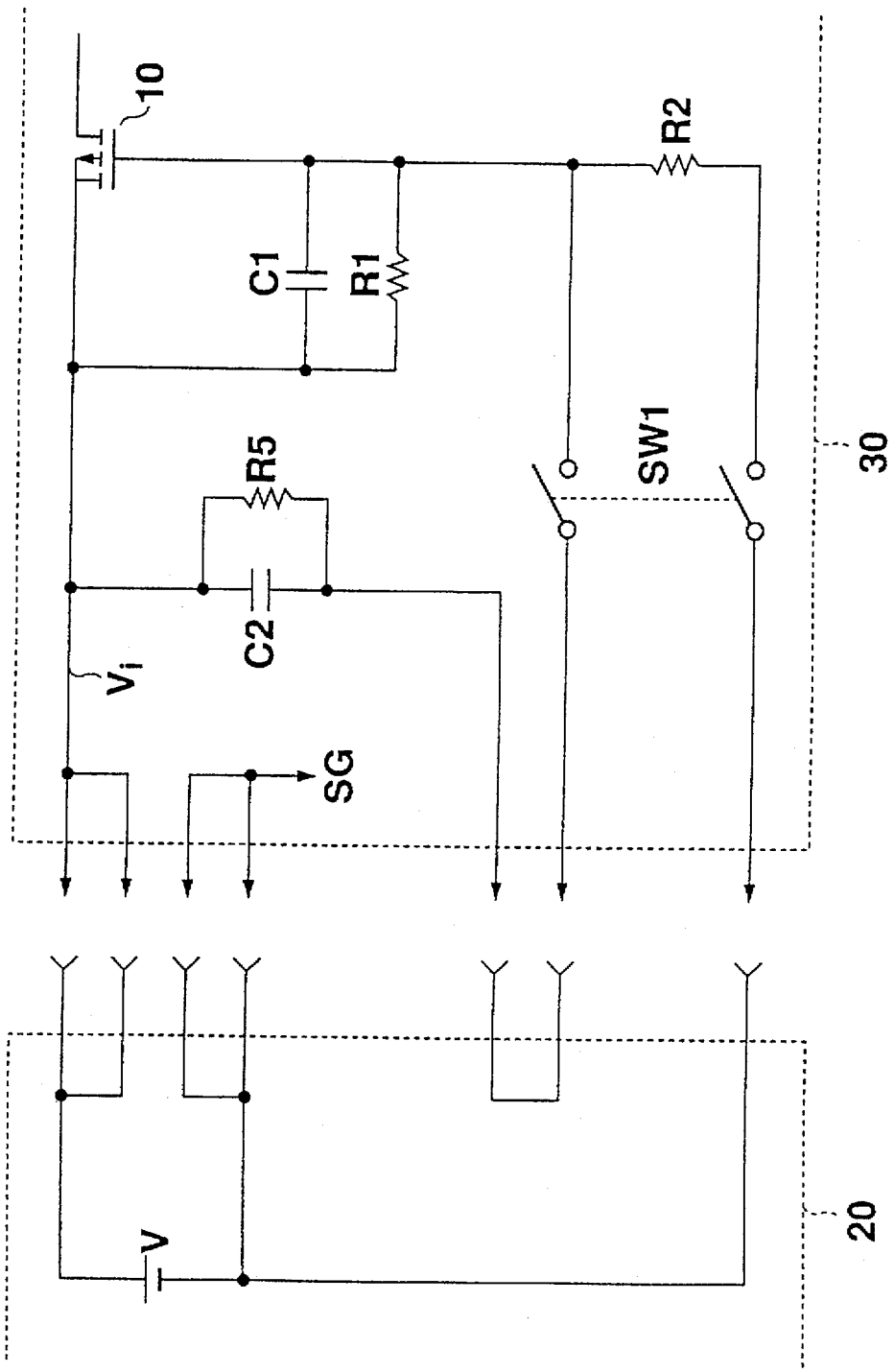
FIG. 4 is a schematic circuit diagram of the interface apparatus showing a modification of the third embodiment.

In this embodiment, the monitoring of the completely inserted state of the short terminal pairs can be replaced by the monitoring of the position of the movable element, as is shown in FIG. 4. In such a case, the switch 1 simultaneously controls opening and closing of the first and second signal lines. The other operations are easily understood from the above-mentioned explanation in combination with the second and third embodiment.

<Embodiment 4>

Figure 5:
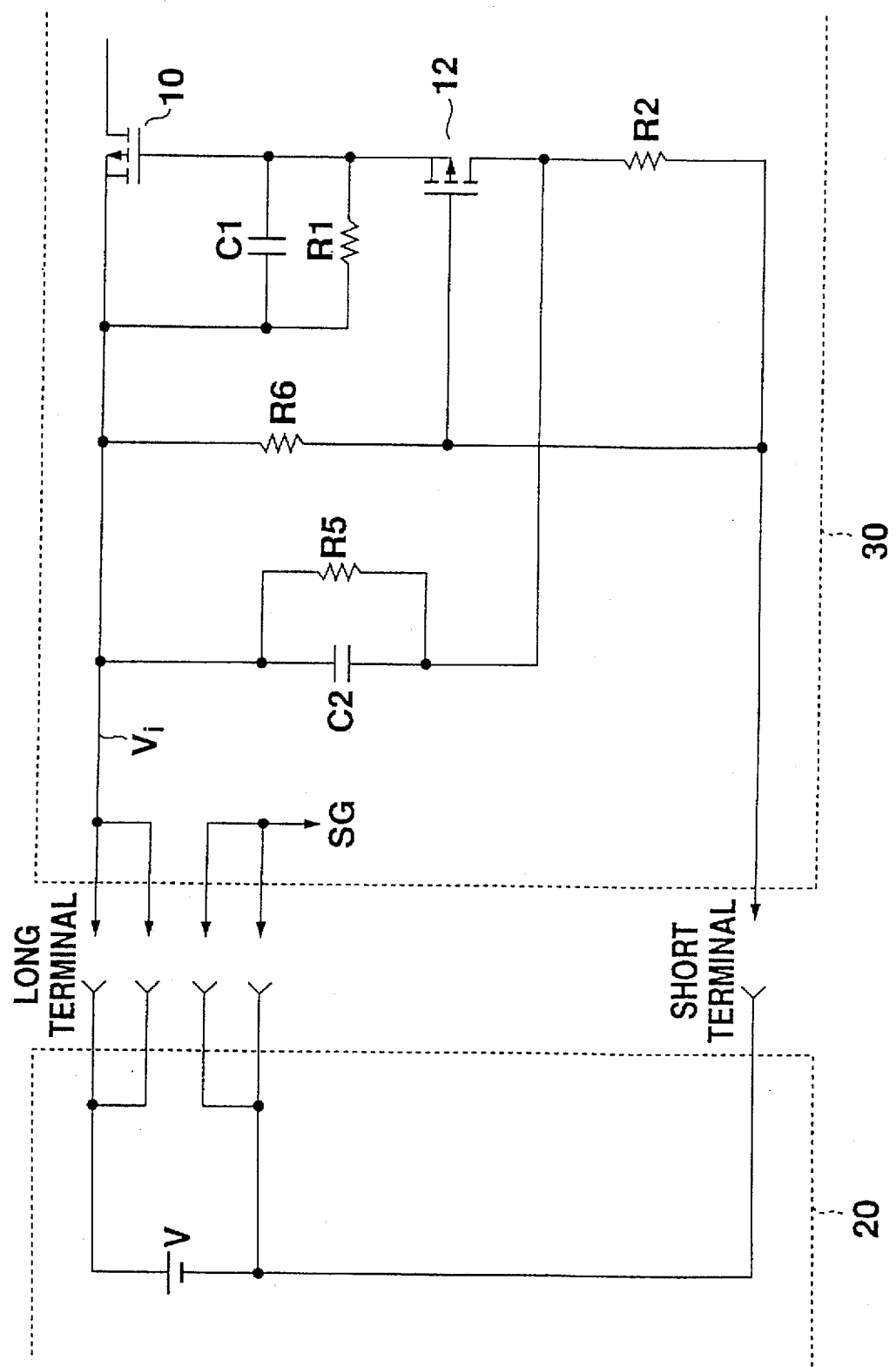
FIG. 5 is a schematic circuit diagram of the interface apparatus in accordance with the fourth embodiment of the invention.

The interface apparatus in accordance with the fourth embodiment also includes the second delay circuit, but is characterized in that the number of short terminal pairs is reduced to only one and instead, a second FET 12 is provided. This structure is shown in FIG. 5. Disconnection of the second delay circuit during the extraction of the peripheral unit is done by the second FET 12, not by the short terminal pairs. The second FET 12 is provided between the output of the second delay circuit and the base of the FET 10. The gate of the second FET 12 is connected to the short terminal and the signal from the FET 12 is pulled up via the resistor R6 to the source terminal (long terminal). As a result, the second FET 12 can be quickly turned on when the peripheral unit is inserted, and can be quickly turned off when the peripheral electronic device is removed. The second FET 12 is in the ON state only in the completely inserted state.

The first state indicating signal line extends from the source terminal through R1, the source and drain of the second FET 12, and R2 to the short terminal (SG), while the second signal line extends from the source terminal through R5 and R2 to the short terminal (SG).

Electric current feeding during the hot-line attaching/detaching in this embodiment is substantially the same as that in the third embodiment as long as quick ON/OFF operation of the second FET 12 is ensured. Of course, it is possible to substitute the monitoring of the movable element for monitoring of the short terminal.

<Embodiment 5>

Figure 6:
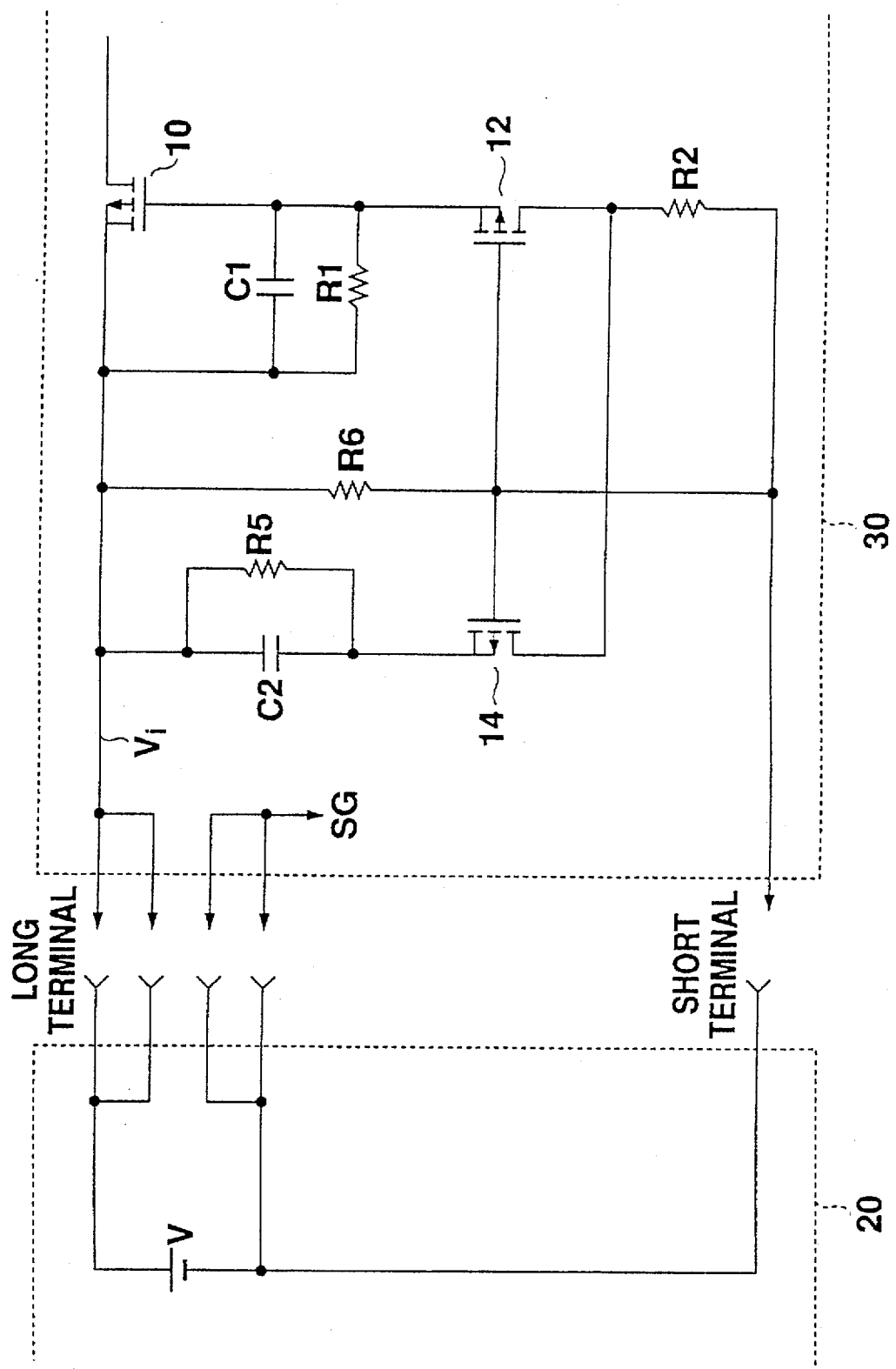
FIG. 6 is a schematic circuit diagram of the interface apparatus in accordance with the fifth embodiment of the invention.

FIG. 6 shows an interface apparatus in accordance with the fifth embodiment of the invention. This embodiment is to completely cut off the second delay circuit, which has not been achieved in the fourth embodiment. In the circuit of the fourth embodiment, the second delay circuit was cut off by the second FET, not by extraction of the short terminal as in the third embodiment. Therefore, a loop circuit, 2nd delay circuit→R2→R6→2nd delay circuit, still remains even after OFF operation of the second FET, which is contrary to the third embodiment where the second delay circuit was completely cut off from the system of the peripheral unit 30 by disconnection of the short terminal. In order to compensate for the incomplete cutting off, in the fourth embodiment, each of the circuit constants had to be provided by a relatively complex calculation to accurately determine a time constant for the hot line attachment/detachment.

In the fifth embodiment, a third FET 14 is provided between the second delay circuit and R2 to cut off the remaining loop circuit, in the fifth embodiment. The base of the third FET 14 is directly connected to the base of the second FET 12.

In this structure, the state indicating signal lines are the same as those in the fourth embodiment, but the second signal line is defined as a line from source terminal→R→source and drain of 3rd FET→R2→short terminal (SG).

It should be understood that the condition of electric current feeding in this embodiment is also the same as that of the third embodiment as long as quick ON/OFF operation of the second and third FETs 12 and 14 is ensured during insertion and extraction of the peripheral unit 30. Instead of monitoring the short terminal, a movable element may be provided, the position of which is monitored to detect the completely inserted state.

<Sixth Embodiment>

Figure 7:
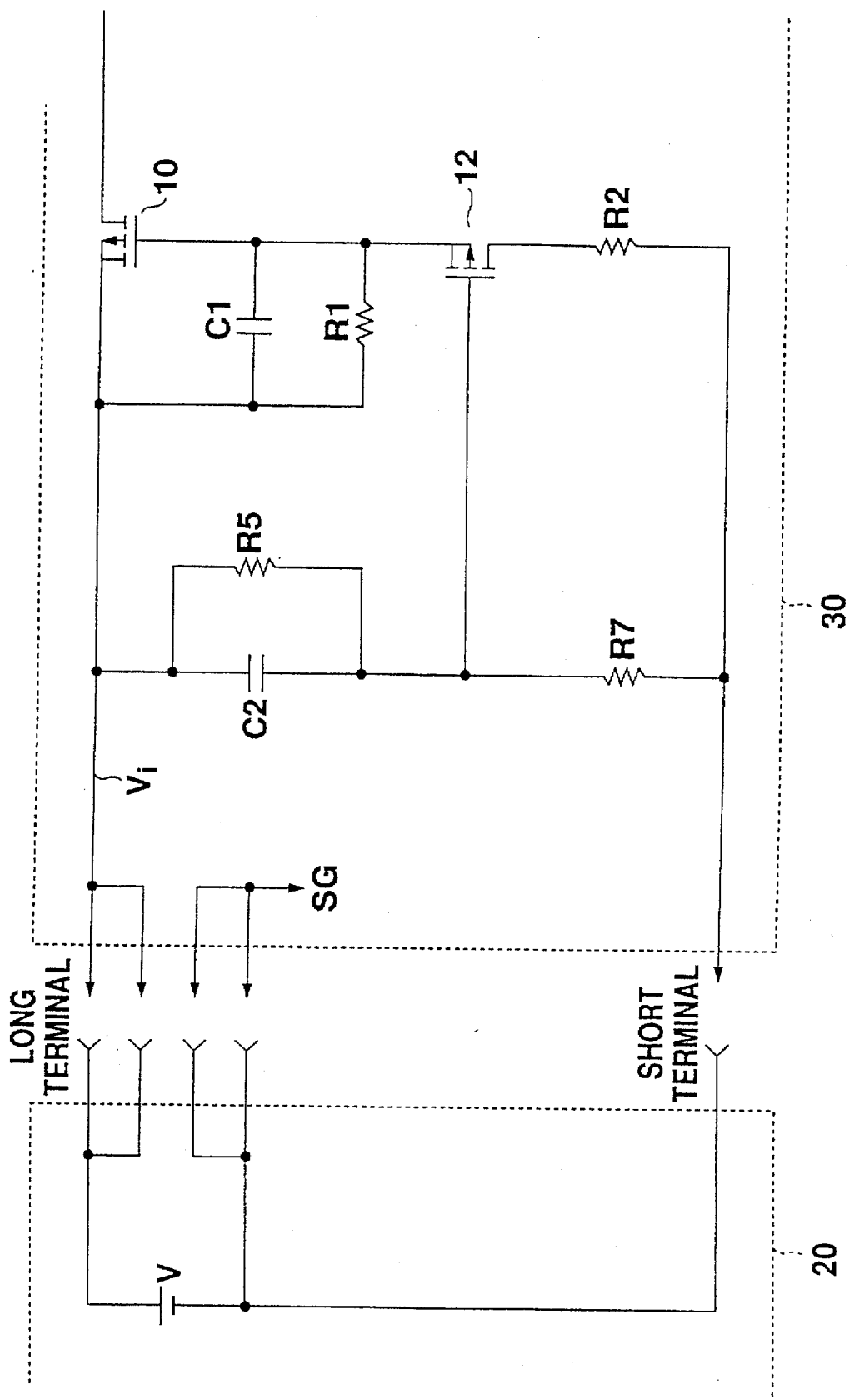
FIG. 7 is a schematic circuit diagram of the interface apparatus in accordance with the sixth embodiment of the invention.

FIG. 7 shows an interface circuit in accordance with the sixth embodiment. The feature of this embodiment is that the time constant for insertion of the peripheral unit 30 is set to be large. This is achieved by connecting the output of the second delay circuit to the gate of the second FET 12, not to the FET 10, to confer a delay to the ON operation of the second FET 12. The second delay circuit does not influence extraction of the peripheral unit 30.

The second delay circuit consists of a capacitor C2, a resistor R5, and a resistor R7, in which outputs from R5 and R7 are connected to the gate of the second FET 12.

Electric current feeding for the hot line attaching/detaching is as follows.

[1] Insertion of the Peripheral Unit

When the peripheral unit is in the completely inserted state where both long and short terminal pairs are connected, electric current flows through R5 and R7 in the second delay circuit to charge the capacitor C2, and the gate voltage of the second FET 12 gradually decreases. The second FET 12 starts to smoothly flow electric current to charge the capacitor C1, and the FET 10 is turned ON. The time constant τ is a large value because it is approximately the sum of the time constant τ1 of the first delay circuit and the time constant τ2 of the second delay circuit.

[2] Extraction of the Peripheral Unit

When the short terminal pair is disconnected, the drain of the second FET 12 is in the state almost equal to the open state, and the second delay circuit is isolated. The time constant for the extraction is represented as C1*R1.

In this structure, abrupt transition of electric current feeding can be further restricted during insertion of the peripheral unit. This embodiment is more advantageous than the third embodiment, in that it does not need a large value of capacitance for each capacitor. In the third embodiment, a capacitor having a large capacitance was used for C2 for the purpose of increasing the time constant for insertion, while maintaining the time constant for extraction. The size of the capacitor tends to be in proportion to the capacitance thereof, the sixth embodiment is superior to the third one.

Although, in the above-described embodiments, the power source applies positive voltage to the apparatus, negative voltage is also applicable.

It should be understood that many substitutions or modifications can be made by those skilled in the art, without departing from the scope and spirit of the appended claims.

What is claimed is:

1. An interface apparatus for connecting, through insertion/extraction, a peripheral unit to and from a main unit during electrical operation of the main unit, the peripheral unit being powered by electric current fed from the main unit through the interface apparatus, comprising:

monitor means for monitoring if the peripheral unit is in a completely inserted state; and control means for controlling electric current supplied from the main unit to the peripheral unit, the control means including a first delay circuit and a second delay circuit, wherein upon insertion said control means prohibits supply of electric current before the peripheral unit reaches the completely inserted state as determined by said monitor means and gently increases electric current supply during a first predetermined time period after the peripheral unit is in the completely inserted state, the first predetermined time period being defined by delays generated by said first and second delay circuits, wherein said control means maintains a steady electric current supply after said first predetermined time period, wherein upon extraction of the peripheral unit, said control means gently decreases electric current supply during a second predetermined time period after the peripheral unit is out of the completely inserted state as determined by the monitor means, the second predetermined time period being defined by a delay generated solely by said first delay circuit, and wherein said control means stops the electric current supply after said second predetermined time period.

2. The interface apparatus according to claim 1, further comprising a connector for connecting the peripheral unit and the main unit, said connector including long terminal pairs having a long pin contact length and at least one short terminal pair having a short pin contact length, wherein the completely inserted state is defined as a state where the short terminal pair is connected, and wherein said monitor means monitors the connection state of the short terminal pair to determine if the peripheral unit is in the completely inserted state.

3. The interface apparatus according to claim 2, wherein the long terminal pairs include at least source terminal pairs for supplying electric current from the main unit to the peripheral unit, and grounding terminal pairs.

4. The interface apparatus according to claim 1, wherein said monitor means includes a state indicating signal line, through which an amount of electric current flows with the amount varying based upon whether the peripheral unit is in the completely inserted state, wherein said first delay circuit is coupled to said state indicating signal line to receive a different voltage in accordance with the amount of electric current flowing in said state indicating signal line.

5. The interface apparatus according to claim 4, wherein said first delay circuit comprises an integrator that includes a first resistor and a capacitor and a second resistor, wherein said first predetermined time period is defined by a first time constant that is based on values of the first resistor, the second resistor, and the capacitor, and wherein said second predetermined time period is defined by a second time constant that is based only on values of the first resistor and the capacitor.

6. The interface apparatus according to claim 5, wherein the second predetermined time period is set to be smaller than a time period taken from starting to completion of the extraction of the peripheral unit.

7. The interface apparatus according to claim 1, wherein said monitor means includes a state indicating signal line through which an amount of electric current flows with the amount varying based upon whether the peripheral unit is in the completely inserted state, wherein said control means further includes a first switching element and wherein said first delay circuit includes a first integrator, said first integrator having an output and an input coupled to said state indicating signal line, wherein a different voltage is applied to the input of said first integrator in accordance with the amount of electric current flowing in said state indicating signal line, said first switching element having an opening/closing control terminal for controlling opening and closing of an electric current path supplied from the main unit to the peripheral unit, the output of said first integrator being connected to the opening/closing control terminal of said first switching element irrespective of whether the peripheral unit is in the completely inserted state.

8. The interface apparatus according to claim 7, wherein said second delay circuit includes a second integrator having an output and an input coupled to said state indicating signal line, wherein a different voltage is applied to the input of said second integrator in accordance with the amount of electric current flowing through said state indicating signal line, the output of said second integrator being connected to the opening/closing control terminal of said first switching element only when the peripheral unit is in the completely inserted state.

9. The interface apparatus according to claim 8, wherein the output of said second integrator is connected to the opening/closing control terminal of said first switching element via a signal line which forms a closed loop only when the peripheral unit is in the completely inserted state.

10. The interface apparatus according to claim 8, wherein said control means further includes a second switching element, and the output of said second integrator is connected via said second switching element to the opening/closing control terminal of said first switching element.

11. The interface apparatus according to claim 7, wherein said first switching element is a FET, and the output of said first integrator is connected to a gate of the FET.

12. The interface apparatus according to claim 7, wherein said state indicating signal line forms a closed loop only when the peripheral unit is in the completely inserted state, and only at that time, does direct electric current flow in said state indicating signal line.

* * * * *